United States Patent [19]
Lewis et al.

[11] Patent Number: 6,131,949
[45] Date of Patent: Oct. 17, 2000

[54] VENTING SYSTEMS FOR INFLATABLES

[75] Inventors: Donald J. Lewis, Scottsdale; Wayne R. Mayville; Eric A. Gebhard, both of Phoenix, all of Ariz.

[73] Assignee: The B. F. Goodrich Company, Charlotte, N.C.

[21] Appl. No.: 09/329,014

[22] Filed: Jun. 9, 1999

[51] Int. Cl.[7] .................................................. B60R 21/28
[52] U.S. Cl. ............................................ 280/739; 280/733
[58] Field of Search ..................................... 280/733, 739, 280/728.3

[56] References Cited

U.S. PATENT DOCUMENTS 5,496,059  3/1996  Bauer ................................. 280/728.3
5,797,619  8/1998  Bauer et al. ....................... 280/728.3
5,853,192  12/1998  Sikorski et al. ....................... 280/739

*Primary Examiner*—Eric Culbreth
*Attorney, Agent, or Firm*—Russel C. Wells

[57] ABSTRACT

A venting system venting inflated inflatables at a predetermined time period after inflation utilizes non-flaming pyrotechnic materials. The system is used in the restraint system of a vehicle and senses the initiation of a crash pulse to control the passage of inflation fluid to the inflatable. A pyrotechnic delay column responds to the inflation gas to activate an output member connected to the outside surface of the inflatable to weaken the threads of the fabric. As adjacent threads weaken, a rip is created which very quickly cause the inflatable to deflate. In an alternative embodiment, an initiator responsive to an actuating signal generated by a crash pulse activates the pyrotechnic delay column.

30 Claims, 8 Drawing Sheets

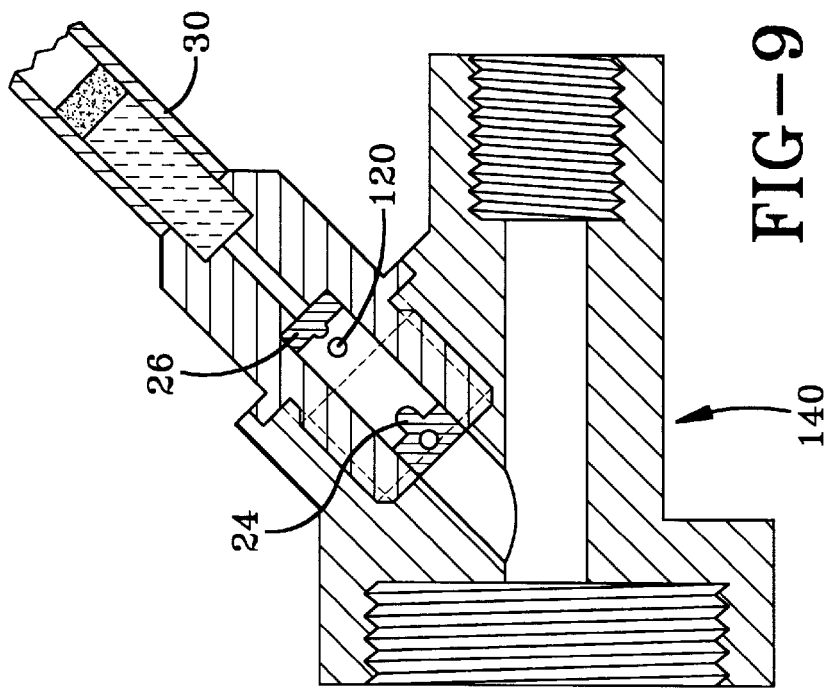
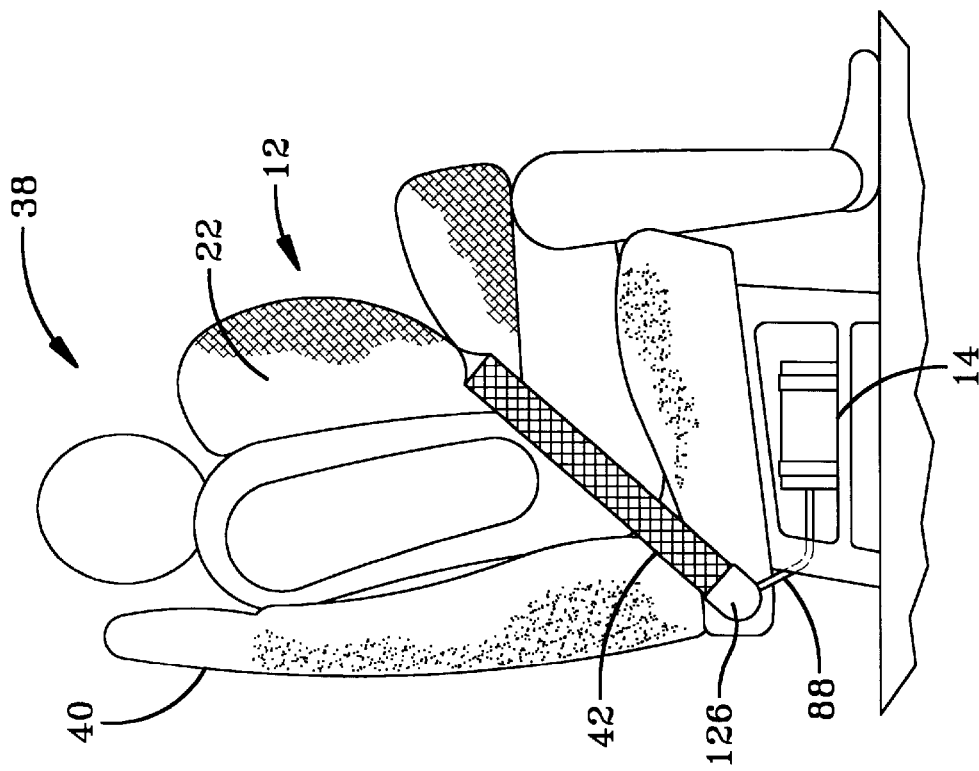

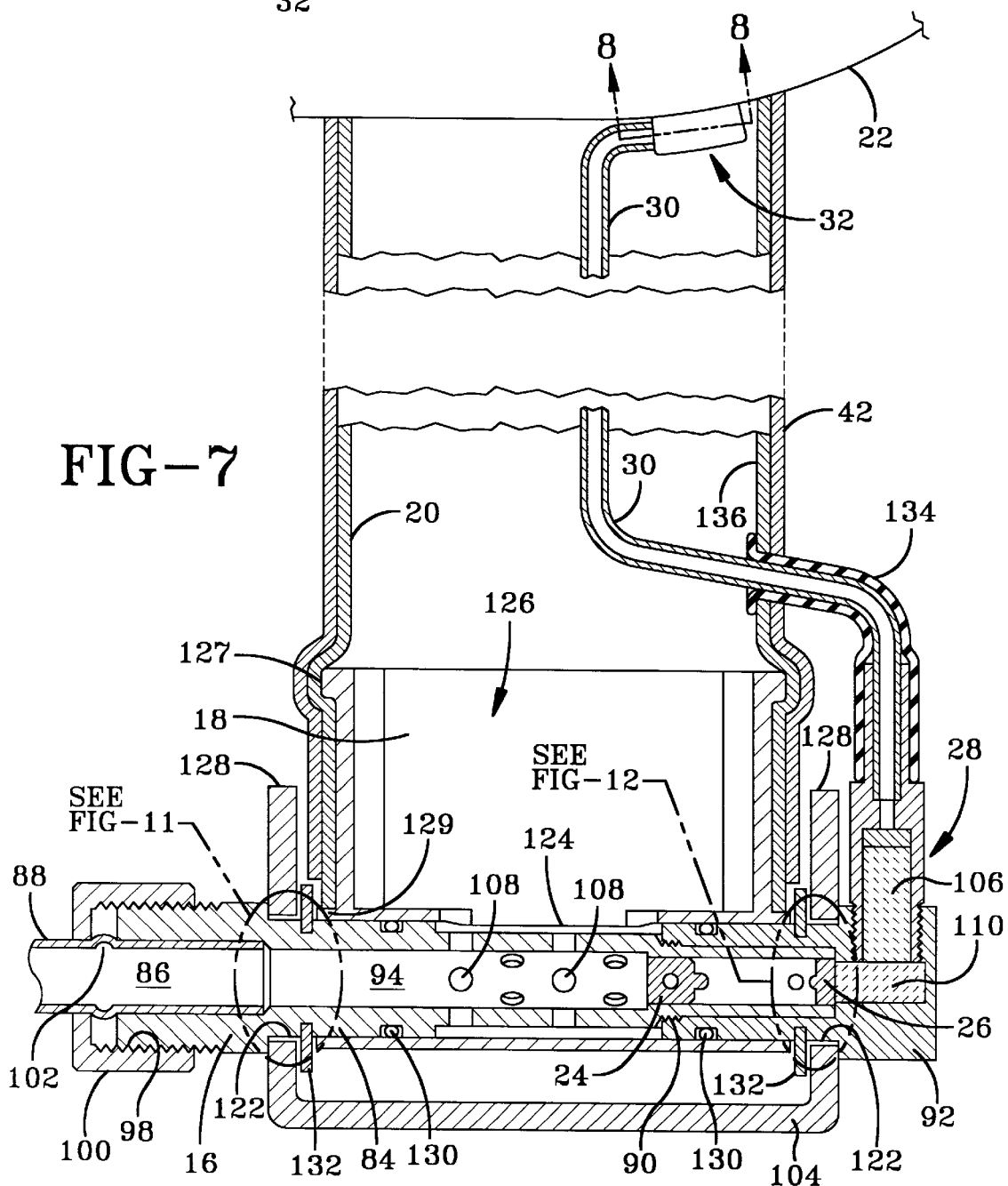

VENTING SYSTEMS FOR INFLATABLES

BACKGROUND OF THE INVENTION

1. Field of the Invention

This invention in general relates to inflatable devices such as air bags, Inflatabelt™ system, escape slides and other devices that are inflated by means of a stored or generated gas and more particularly to a time operated venting system for a time release of the gas from the inflatable.

2. Description of the Related Art

Inflatable devices such as air bags as found in motor vehicles are rapidly inflated by means of a gas-generating device such as an inflator. Once the device is inflated, it must quickly be deflated to allow the vehicle passenger to exit the vehicle. Such devices typically have large openings in the inflatable to allow the gas to escape.

In other inflatable devices, it is desired to control the release of the gas at a certain time after the inflation. In still other devices, since the inflator does not have the capacity to inflate an inflatable while at the same time the inflatable has a large opening the deflation of the inflatable must be accomplished in other ways.

SUMMARY OF THE INVENTION

It is a principal advantage of the present invention to automatically control the deflation of an air bag at a predetermined time after inflation.

It is yet another advantage of the present invention to use non-flaming pyrotechnics in an environment wherein there are occupants of a vehicle.

It is yet another advantage of the present invention to use non-mechanical devices to deflate the inflatable in an environment wherein there are occupants of a vehicle.

It is still yet another advantage of the present invention controllably tear or rip an air bag at a predetermine location to maintain the safety of the occupant.

It is still another advantage to allow the occupant the opportunity to detach the air bag after the air bag has been deflated thereby allowing the occupant to egress from his/her seat.

These and other advantages are found in a venting system for an inflatable air bag connected to seat belt webbing. The seat belt webbing has one end connected to a source of inflation gas and the other end connected through a tongue and buckle assembly to the seat.

An axially extending fluid passageway is connected to the source of the inflation gas for receiving the pressurized inflation gas for distributing the inflation gas to the air bag. A firing pin is located in the passageway and responds to the pressure of the inflation gas to axially move along the passageway.

A primer is located at the end of the passageway downstream from and axially in line with the firing pin. The primer is adapted to ignite an ignition charge. An elongated pyrotechnic device such as a shock tube or gas transfer tube is connected at one end to the air bag and at the other end to the ignition charge. The elongated pyrotechnic device responds to the burning of the ignition charge for opening a rip in the air bag allowing the inflation gas to escape and the air bag to deflate.

DESCRIPTION OF THE DRAWINGS

These and other advantages are found in the following detailed description and claims wherein the drawings are described as follows.

FIG. 3 is a side view of an occupant sitting in a vehicle seat with the inflatable inflated against the occupant;

FIG. 7 is a sectional view of the venting system;

FIG. 8 is a sectional view taken along line 8—8 in FIG. 7;

FIG. 9 is an alternate embodiment of the firing mechanism;

DETAILED DESCRIPTION OF THE PREFERRED EMBODIMENT

Figure 1:
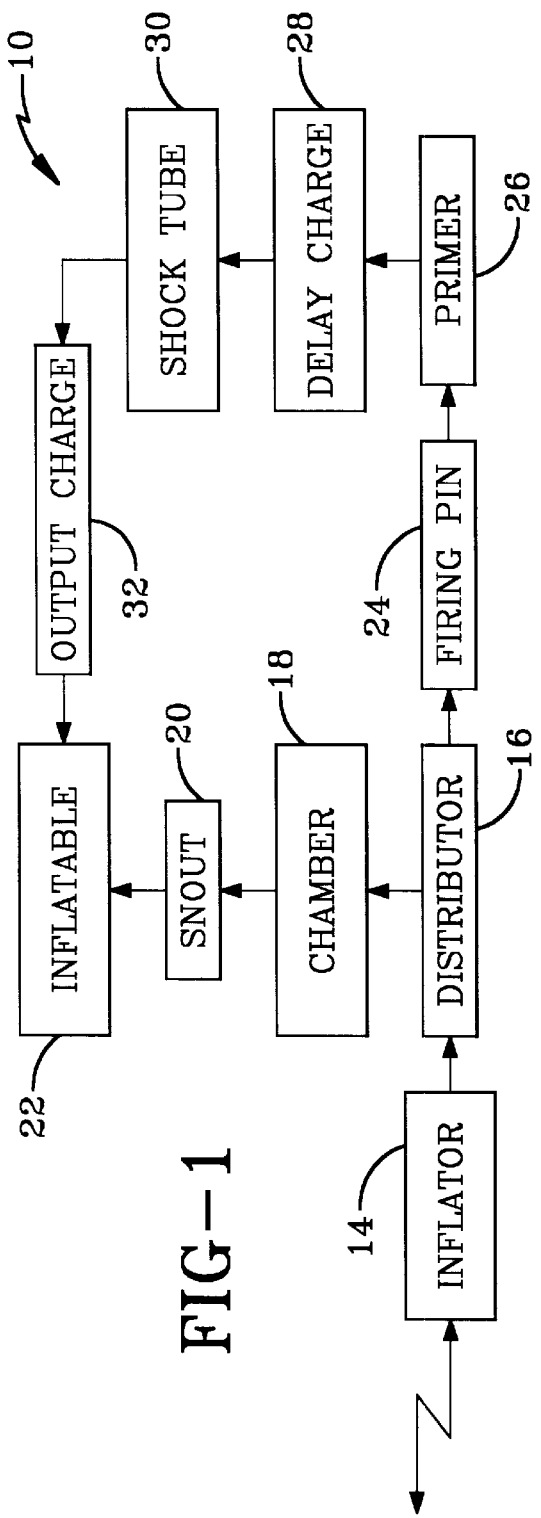
FIG. 1 is a block diagrammatic schematic of the venting system according to the present invention.

Referring to the Figs by the characters of reference, there is illustrated in FIG. 1 a schematic block diagram of a venting system 10 for an inflatable air bag system 12. The venting system 10 has an inflator 14, a gas distributor 16, a chamber 18, a snout 20 and an inflatable or air bag 22. Located within the gas distributor 16 is a firing pin 24, a primer 26, a delay charge or column 28, a shock tube 30 and a contact charge 32 connected to the inflatable 22.

Figure 2:
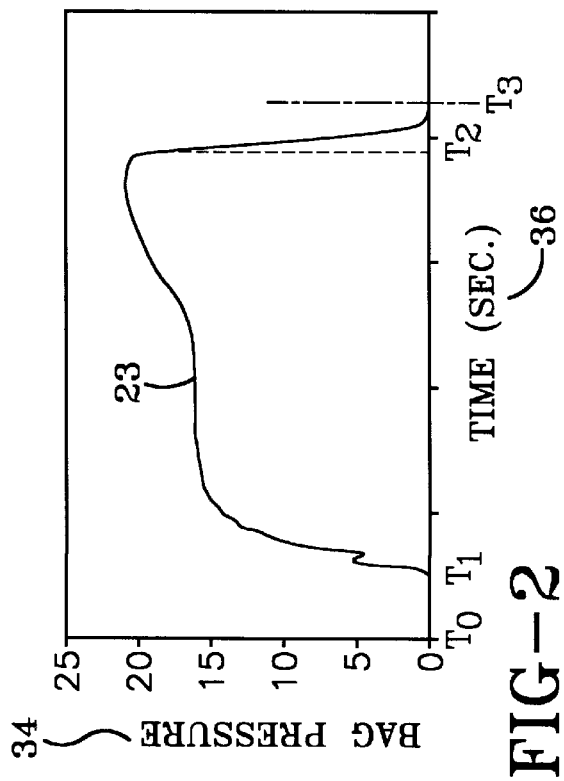
FIG. 2 is a representative graph of the timing of the operation of a venting system in an inflatable air bag system.

First referring to the graph 23 of FIG. 2, which is a graph of pressure 34 in one embodiment of an inflatable air bag system 12, plotted against inflation time 36. Co-pending patent application entitled Inflatable Air Bag For An Inflatable Restraint System having U.S. Ser. No. 09/329,015 and filed on Jun. 9, 1999, describes a preferred embodiment of the inflatable air bag system 12 and will sometimes hereinafter be referred to as the Air Bag System.

This graph 23 illustrates the objective of the present invention. The graph 23 shows that at time T1, the inflation fluid or gas is beginning to enter into the inflatable 22 of the Air Bag System. In FIG. 3, as the inflation gas fills the air bag 22, the seat belt webbing 42 tightens about the waist of the occupant 38 pulling him/her back and down into the seat 40. At some time, intermediate times T1 and T2, the inertia of the crash causes the head and the upper body of the occupant 38 to bend forward about the seat belt webbing 42 into the air bag 22. As the upper body moves into the air bag 22, the upper body compresses the inflation gas in the air bag 22 raising the pressure due to the smaller gas volume. At some time, T3, the occupant 38 has traveled as far as the seat belt webbing 42 will allow and would begin to rebound back in his seat if the air bag 22 was still inflated. As shown in FIG. 3, the occupant 38 is strongly held back in his seat 40 by his/her seat belt webbing 42 around his/her hips. In order to prevent rebound, the present invention is a method and apparatus for automatically venting the inflatable or air bag 22 just as the occupant 38 reaches or approximately reaches its forward-most position. This time is T2 on the graph 23.

Figure 4A:
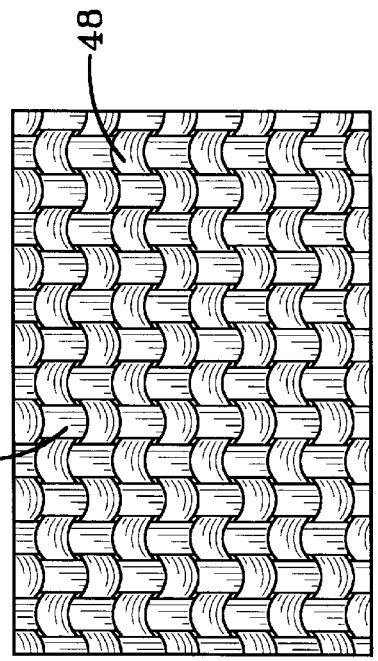
FIGS. 4A–4E is a schematic view of a portion of the fabric of the envelope showing the effect of weakening one thread and the resultant breaking of the adjacent threads causing a rip or tear.

FIGS. 4A–4E illustrate the anatomy of a tear or rip 44 in the air bag 22 as a result of the venting system 10 herein. This is also what happens when any woven fabric is torn or ripped. In FIG. 4A there is illustrated a section of the air bag 22 as it appears prior to and during inflation. The air bag 22 is woven with a relatively tight weave to contain the inflation gas. As illustrated in FIG. 2 the maximum pressure in the preferred embodiment of the air bag 22 a full inflation is approximately twenty pounds per square inch. For the purposes of illustration, this is the force, F, in FIGS. 4B–4E.

Figure 4B:
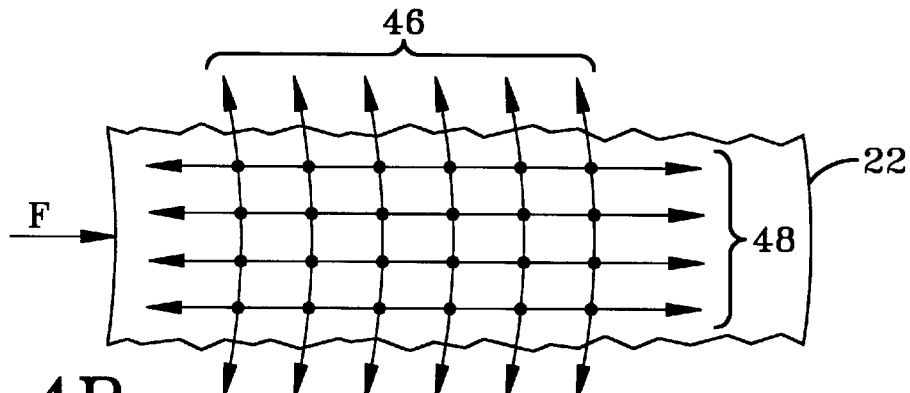
Figure 4C:
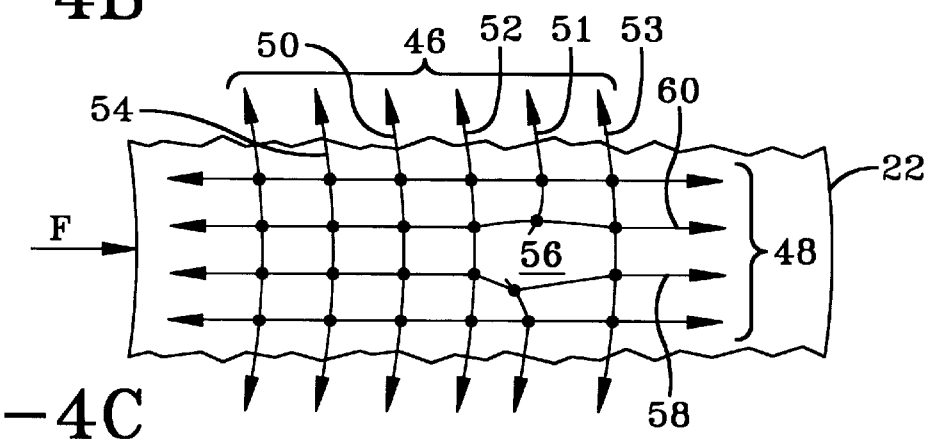
Figure 4D:
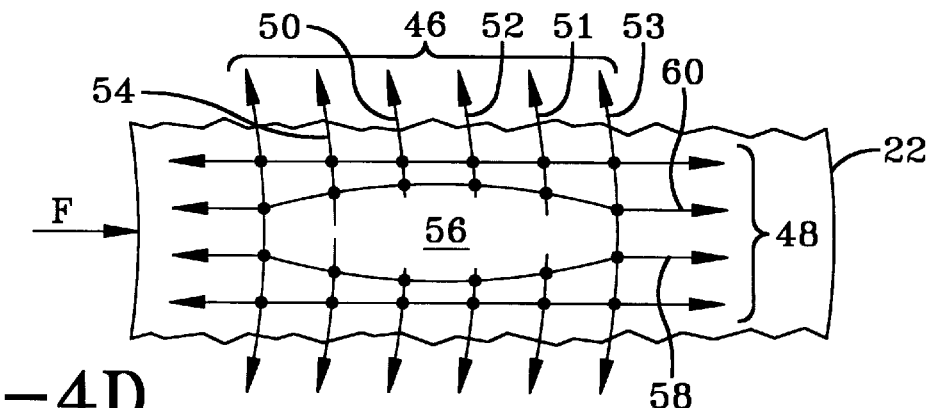
Figure 4E:
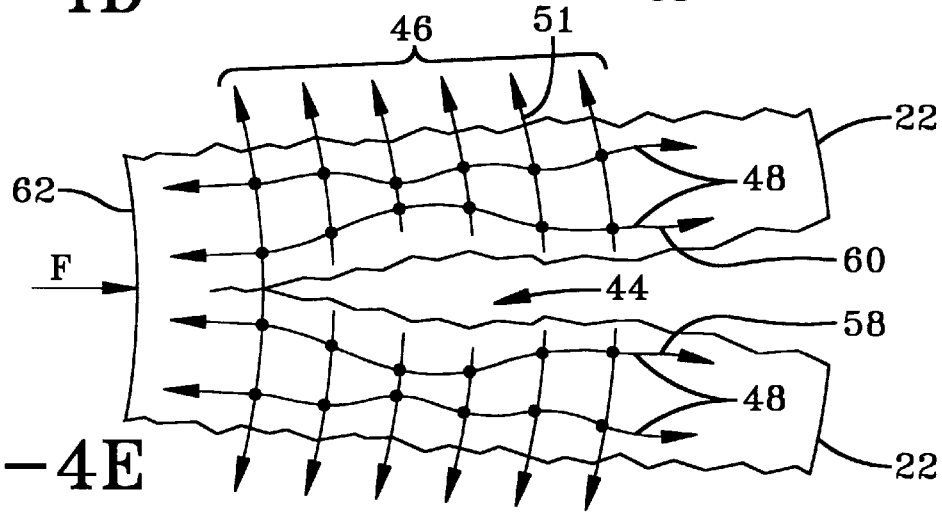

FIG. 4B is a schematic of a very small section of the air bag 22. The bag is typically a woven fabric with transverse 46 and longitudinal 48 threads. Each thread 46, 48 is subjected to the force F and is in tension. In FIG. 4B all of the threads 46, 48 are intact and the bag 22 retains the inflation gas. In FIG. 4C one of the transverse threads 51 has been broken and the load it was carrying is now transferred to the adjacent threads 52, 53, 50, 54. As the adjacent transverse threads 52, 53, 50, 54 weaken, they continue to break as illustrated in FIG. 4D forming a hole 56. This is the beginning of the tear or rip 44 of the fabric which tear or rip is illustrated in FIG. 4E. The tear or rip 44 will very rapidly continue along the longitudinal threads 58, 60 for the length of the fabric unless there is a reinforcement or barrier 62 to stop the tear. This is illustrated in FIG. 4E as being a fold although other such barriers are well known in the art.

As will be hereinafter described and shown, it is the function of the venting system 10 to create a high temperature or pressure at a desired place on the air bag 22. The material of the air bag 22 typically is nylon, polyester or other thermoplastic thread but the threads are not so limited to such materials as cotton, hemp, etc. are acceptable. All that is necessary is that the threads when subjected to high localized heat or a pressure activated device will begin to melt or weaken losing their strength to form the beginning of the rip 44 as illustrated in FIG. 4C.

Figure 5:
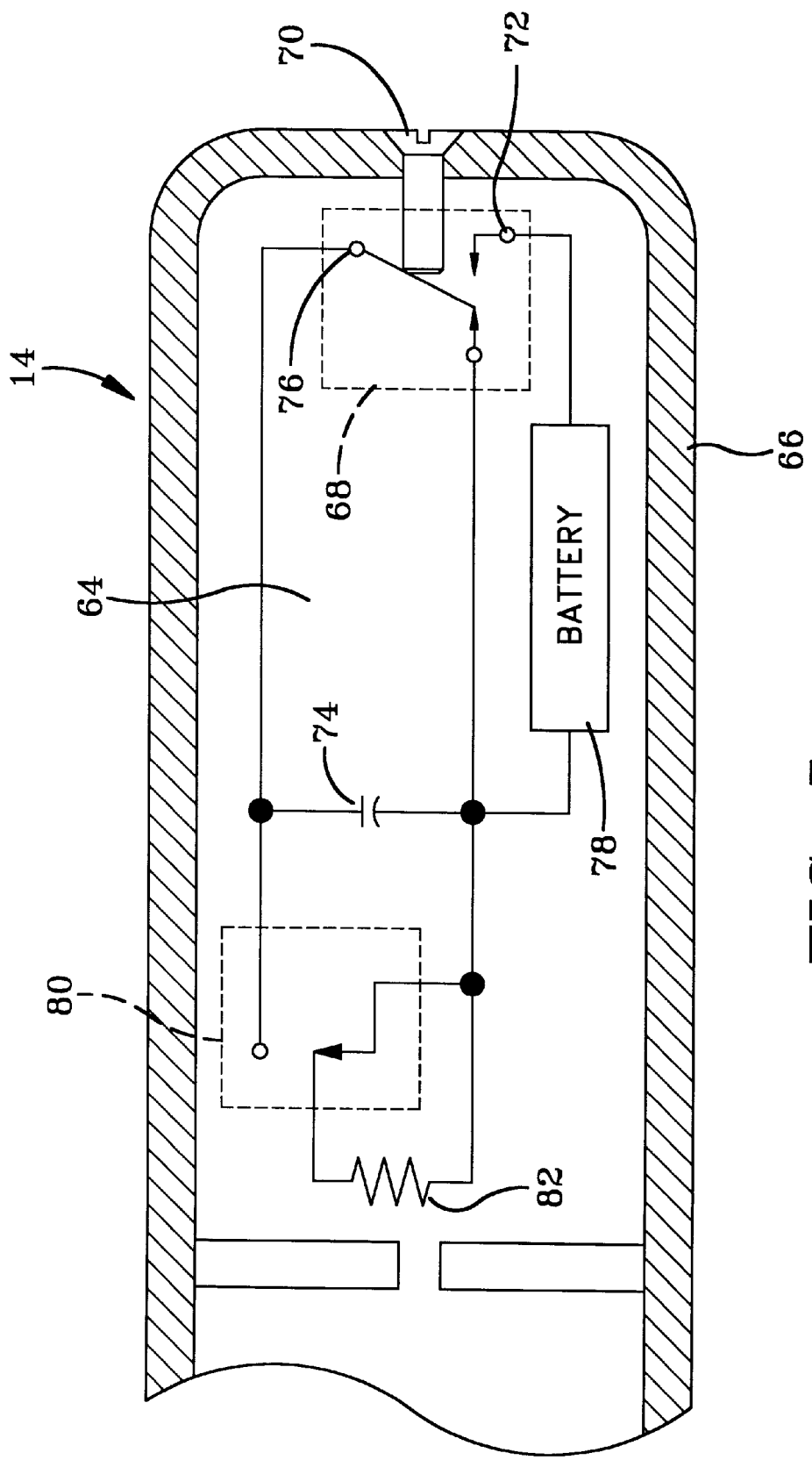
FIG. 5 is a schematic view of the inflator control system.

Referring back to FIG. 1, in the preferred embodiment the inflator 14 may be that as shown and described in co-pending patent application and entitled High Thermal Efficiency Inflator and Passive Restraints Incorporating Same. This is a continuation-in-part of co-pending U.S. application Ser. No. 08/587,773, filed Dec. 22, 1995 and having Ser. No. 09/444,730 and filed Nov. 18, 1999. The inflator 14 carries a stored propellant which when subjected to a high heat created by its control circuit 64, such as that illustrated in FIG. 5, will generate an inflation gas at a very high pressure in the inflator 14. The gas is released from the inflator 14 and eventually is supplied to the inflatable 22. In the alternative, the source of inflation gas may be a source of stored gas that is connected to the gas distributor in place of the inflator.

The control circuit 64 of the inflator 14 is inside a faraday shield housing 66 of the inflator. Beginning at the end opposite the outlet of the inflator 14, there is a safety or arming switch 68. To arm the switch 68, the setscrew 70 is removed. The arming switch 68 is represented as a single pole double throw switch wherein the normally open contact 72 is connected to one side of the firing capacitor 74 and the single pole 76 is connected to the other side of the capacitor 74. In this manner, with the setscrew 70 in place, the firing capacitor 74 is shorted out and will not charge. The firing capacitor is sized to provide sufficient energy to heat the bridge wire of the squib 82.

The normally closed contact 72, which is held open by the setscrew 70, is connected to the battery 78. The battery has a shelf life of many years. This long life predisposes that there is not an external power source and the inflator 14 must be in place for a long time to supply the necessary power to the several circuit elements when a sudden deceleration of the vehicle or a crash occurs.

These elements include a crash or acceleration sensor or switch 80 that will detect a sudden deceleration of the vehicle indicating the need for or conditions indicating the need for the deployment of the inflatable 22 to protect the occupant 38. The sensor 80 is initially adjusted for working in the various force environments such as found in automobiles, airplanes, etc. The output of the control circuit 64 of the inflator 14 is a squib 82 for generating the heat necessary for igniting the propellant within the inflator. The faraday shield 66 in the inflator is for preventing external signals from falsely activating the inflator elements.

Figure 6:
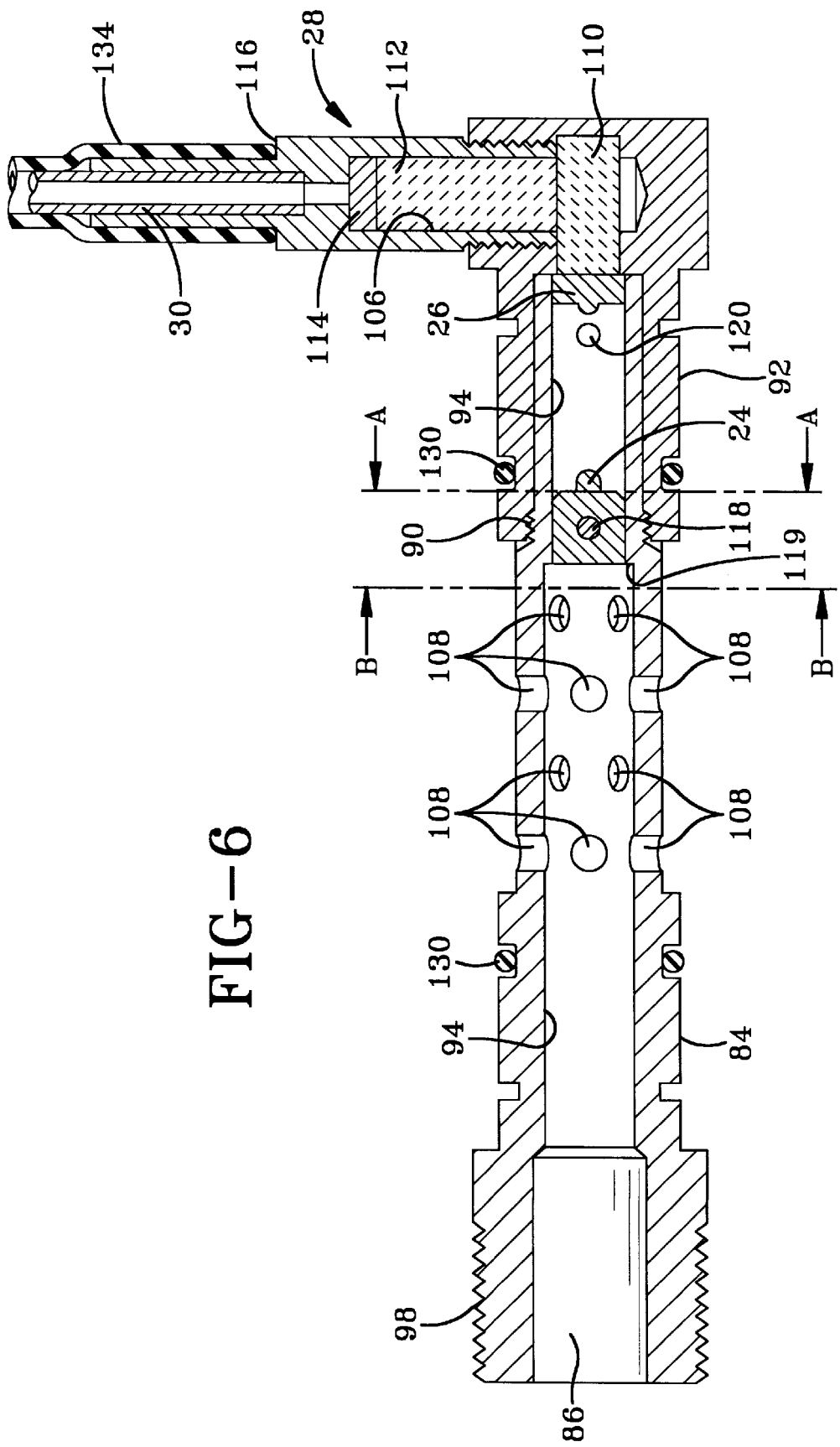
FIG. 6 is a cross-sectional view of the gas distributor and firing mechanism.

The gas distributor 16, illustrated in FIG. 6, is a two-piece stepped tubular member with one piece, the gas inlet housing 84, having an inlet 86 at one end. The inlet 86 is connected through a conduit assembly 88 to the inflator. The gas distributor 16 has a threaded 90 nose end at the other end. The second piece of the tubular member is a firing housing 92 that is located and threaded at the nose end of the first piece. A longitudinal passageway 94 is axially aligned through both the gas inlet housing 84 and the firing housing 92 to conduct the gas from the inflator 14. Along the passageway 94 there are a plurality of radially extending orifices 108 to allow the gas to escape into the chamber 18. An alternative method of assembly is to have both pieces mate in a sliding fit to create a unitary tubular member. A gas-tight fit is not necessary because the gas under pressure exits through the orifices 108 into the chamber 18.

The inlet 86 end of the gas inlet housing 84 is threaded 98 to receive the conduit assembly 88 from the inflator 14. The threading of the conduit assembly to the gas distributor 16 by an appropriate nut 100 with an appropriate ring 102 on the conduit assembly 88 allows the gas distributor 16 to rotate and pivot relative to the conduit assembly 88. This allows the seat belt webbing 42 to rotate with the occupant 38 moving forward in his/her seat. In the alternative, the conduit assembly can be welded to the gas inlet housing 84. During a crash, when the loads on the seat belt are very large, in the range of 318 Kg., a bracket, not shown, holding the gas distributor 16 will try to pivot about its mounting and in order to do so, the conduit will weaken and bend.

The mating of the gas inlet housing 84 and the firing housing 92 by threading the two pieces forms a rigid gas distributor 16 that functions as a tensioning tie for the mounting bracket 104. Instead of threading the two housings 84, 92 together, one of the housings can have a male end and the other a female end wherein the shape of the ends are congruent and anything but round so that the two housings 84, 92 can not rotate relative to each other. Such shapes can be hexagonical; can be formed with a key and keyway or any similar type of non-rotational joining process. However in order to prevent the two housings 84, 92 from separating, they must be pinned, or secured together after assembly.

The passageway 94 in the firing housing 92 functions as a firing bore with the firing pin 24 and the primer 26 spaced apart along the passageway. Transverse to the passageway 94 in the firing housing 92 beyond or downstream of the primer 26 is a second or pyrotechnic passageway 106 containing pyrotechnic materials to be used to initiate the creation of the vent in the inflatable 22.

The plurality of radially extending orifices 108 in the passageway 94 in the gas inlet housing 84 extends in a direction orthogonal to the axis of the passageway 94 in the gas distributor 16. The orifices 108 function to direct the flow of the inflation gas from inside the gas distributor 16 to the outside. The gas leaves the inflator 14 outlet under a relatively high pressure and flows through the conduit assembly 88 and into the gas distributor passageway 94. The cross-sectional area of the various parts of the system described, i.e. the output of the inflator, the conduit assembly and the gas distributor passageway increases in the direction of the gas flow. The number and size of the orifices 108 determines the cross-sectional area to the passage of the gas from the gas distributor 16.

In the present embodiment, the gas distributor 16 has sufficient cross sectional area in the orifices 108 to have the gas distributor 16 to be thrust-neutralized to the flow and force of the inflation gas. The orifices allow the inflation fluid to change its flow direction ninety degrees and into a much larger flow area of the chamber 18. In addition, if the primer 26 is not in place and the Inflator propellant is accidentally ignited, the firing pin 24 will seal the end of the passageway 94 where the primer should have been. If both the primer and the firing pin are not in place, the enclosed end of the pyrotechnic passageway 106 will function as a seal blocking any flow of the gas axially from the passageway 94. In either case, the inflator will not function as a rocket due to the thrust neutralizing created by the orifices 108.

The pyrotechnic passageway 106 contains a first firing or ignition charge 110, a delay charge 112, a second ignition charge 114 and a shock tube holder 116. The gas travelling down the passageway 94 in the gas inlet housing 84 pushes against the firing pin 24. The firing pin 24 is held in position by a searing member such as a shear pin 118 or a shear rim. The shear rim is located circumferentially around the back of the firing pin and extends in a radial direction away from the firing pin for holding the firing pin against an internal rim 119 of the passageway. The shearing member normally locates and secures the firing pin in the passageway and breaks or shears and the firing pin 24 is launched along the passageway in the firing housing 92 toward the primer 26.

At the primer 26 is a vent hole 120 that functions to vent any air that is in the passageway 94 as the firing pin 24 transverses the length of the passageway. Any air trapped in the passageway 94 will slow down and maybe stop the forward movement of the firing pin 24 and thereby cause a misfire. The primer 26 is struck by the firing pin causing the primer 26 to be squashed and generate a flame, heat or pressure. The flame ignites the first firing or ignition charge 110 that subsequently ignites the delay charge 112 causing it to burn. The delay charge 112 is a column of pyrotechnic material that takes a predetermined period of time to have the burn travel its length. In the preferred embodiment, the delay time is less than two hundred milliseconds. When the burn reaches the second ignition charge 114, it causes that charge to burn with sufficient heat to ignite the material in the shock tube 30.

The shock tube 30 is a transferring linear explosive, TLX, material. The inside of the shock tube 30 is coated with a pyrotechnic material that burns at a very rapid rate. The shock tube is anchored to the pyrotechnic passageway 106 at one end, extends through the seat belt assembly to the snout 20 or inflation gas transfer tube as illustrated in FIG. 7. Other TLX materials may be a detonating fuse or cord or pyro-cord. In addition a ballistic gas tube can be employed wherein the tube transmits the gas generated by the second ignition charge to ignite the contact charge 32 or to activate a mechanical member to puncture the inflatable.

Figure 11:
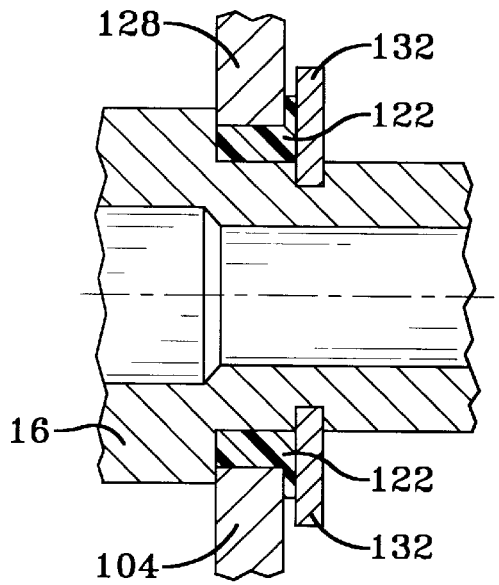
FIG. 11 is a schematic view of the bushing area enclosed by the section circle 11 in FIG. 7.
Figure 12:
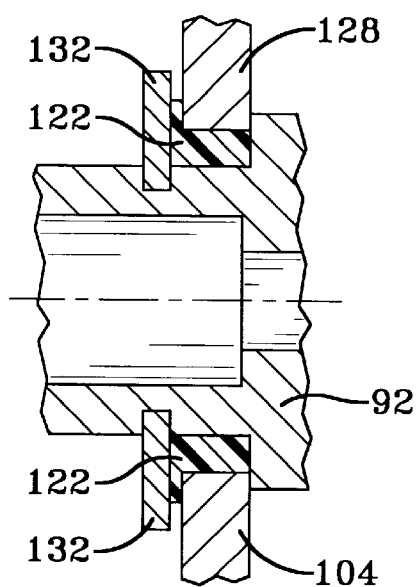
FIG. 12 is a schematic view of the bushing area enclosed by the section circle 12 in FIG. 7.

Referring to FIG. 7, there is illustrated the chamber 18 of the preferred embodiment. Both the chamber 18 and the gas distributor 16 are unitary and the complete device comprising the gas distributor and the chamber rotate about the mounting bracket 104 on the two bearings or bushings 122 that are located in the bearing holes of the mounting bracket 104. The bearing 122 is more clearly shown in the enlarged FIGS. 11 and 12. This rotation allows the seat belt 42 to be adjusted by the occupant 38 to fit around his/her waist regardless of the size of the occupant at the time of buckling-up. In addition, FIG. 7 illustrates the connection of the inflatable air bag system 12 of the preferred embodiment to the chamber 18. This is further described and claimed in co-pending patent application entitled A Seat Belt Anchorage having U.S. Ser. No. 09/329,016 and filed on Jun. 9, 1999, which is incorporated herein by reference.

As illustrated in FIG. 7, the chamber 18 is located in an elongated member or nozzle 126 having a tubular inside diameter equal to the diameter of the bearing surfaces of the gas distributor 16 in order that the two are free to rotate in the mounting bracket 104. Located at one or inboard end of the elongated member there is a slot 124 which opens to the inside of the gas distributor through the orifices 108.

The nozzle 126 is basically a rectangular section having an extended height extending away from the gas distributor 16. At the outboard end of the nozzle, there is a ridge or a rim 127 that extends around the outside surface of the nozzle. The ridge or rim 127 defines the outer limits of a flat surface between the rim 127 and a similar ridge 129 of equal height at the inboard end of the elongated member 126. This surface, as will hereinafter be shown, supports the seat belt assembly 42.

The cross-sectional area of the inside of the nozzle 126 is greater than the cross section area of the slot 124 and the total of the areas of the orifices 108. As the inflation gas leaves the inflator, each new section, in the direction of gas flow, has a cross section that is larger by a factor less than two, than the previous section thereby dropping the pressure of the inflation fluid.

The mounting member 104 is a generally U-shaped member having a base and a pair of outwardly extending arms 128. The mounting member or bracket is fixedly mounted to the seat or seat frame by its base and functions to locate the seat belt assembly. The chamber 18 and the gas distributor 16 are integral and rotate about the bearing holes in the outwardly extending arms 128 of the mounting member. Mounted in each bearing hole of the bracket the bearing or bushing 122, such as a bushing fabricated from nylon or a substantially low friction material to facilitate such rotation.

Figure 13:
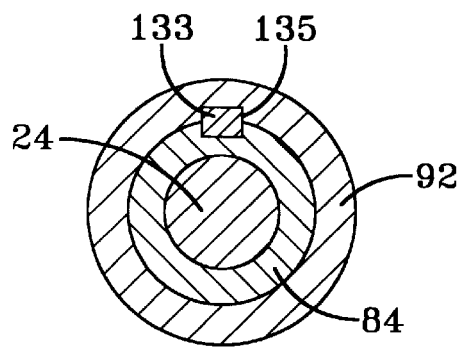
FIG. 13 is a section taken along line A—A in FIG. 6 schematically illustrating another embodiment of the joining of the firing and inlet housings.
Figure 14:
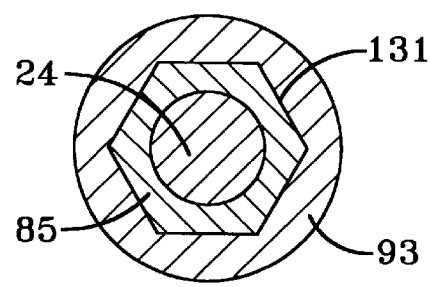
FIG. 14 is a section taken along line A—A in FIG. 6 schematically illustrating still another embodiment of the joining of the firing and inlet housings.
Figure 15:
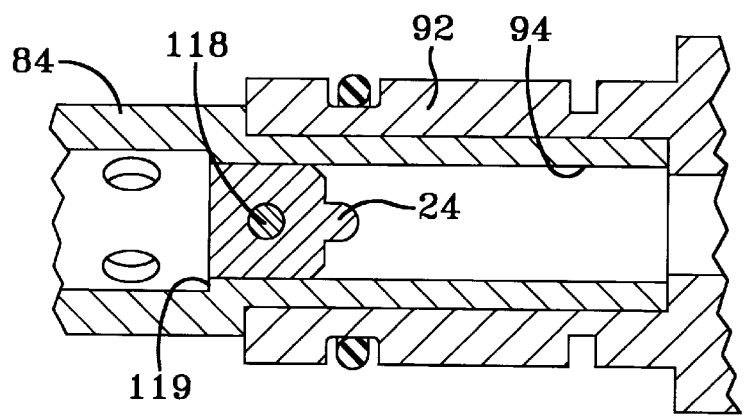
FIG. 15 is a section taken along line B—B in FIG. 6 schematically illustrating yet another embobodiment of the joining of the firing and inlet housings.

The gas distributor 16 is mounted through one of the bushings 122 in a bearing hole in the arms. The chamber 18 is then slid over the gas distributor 16 including its O-rings 130. The O-rings 130 operate to seal between the extremes of the chamber and the gas distributor so that all of the gas flows through the slot 124. The end of the gas distributor is then inserted in the other bearing 122 in the other arm and secured there by means such as a c-clip 132 or other similar holding device. As previously indicated, the gas inlet housing and the firing housing may be slipped fit together, FIG. 15, or may be integrally joined by means of a threaded connection, mating non-rotation sections such as the mating geometric shapes 131 on the gas inlet housing 85 and the firing housing 93 illustrated in FIG. 14, or the key 133 and keyway 135 illustrated in FIG. 13. When the clips 132 are installed, the gas distributor 16 forms a tension tie for the mounting bracket 104. The tension tie functions to keep the arms of the mounting bracket 104 from spreading under the load applied to the gas distributor due to the tensioning of the inflatable seat belt assembly by the occupant during the crash event.

Prior to putting the chamber together with the gas distributor, a seat belt assembly is secured to the flanged nozzle of the air chamber. The seat belt assembly is described and claimed in the co-pending Air Bag System.

As illustrated in FIGS. 3 and 7, the inflatable seat belt assembly has an elongated seat belt webbing 42 that is mounted to the chamber nozzle 126 at one end of the seat belt webbing. The other end of the seat belt webbing extends to the other side of the seat 40, not shown, wherein it typically has a tongue and buckle arrangement with the buckle generally fixedly secured by some flexible member to the seat. The seat belt webbing 42 has an inflatable 22 mounted thereto intermediate its ends between the chamber and the tongue member.

The inflatable 22 must be connected to receive inflation gas from the inflator 14. The chamber nozzle 126 directs the inflation gas out through the snout 20 that is mounted on one surface of the seat belt webbing 42 and connected to the inflatable 22.

From the pyrotechnic passageway 106 of the gas distributor, the shock tube 30 extends through a protective tube 134 and through the wall 136 of the snout 30 and the seat belt webbing. The protective tube 134 forms a boot that extends over the pyrotechnic passageway and is firmly attached to the snout. The shock tube 30 is mounted to a receptacle 138 on the inflatable 22 that contains the contact charge 32. The contact charge 32 is a compound that is secured to the wall of the inflatable 22 in the receptacle 138. The compound responds to the heat generated by the shock tube 30 to ignite in a flameless manner to heat through and melt, weaken or cut the threads 46, 48 of the bag 22 as illustrated in FIGS. 4A–4E. If the shock tube is a ballistic gas tube, the contact charge 32 will respond to the pressure of the gas in the tube to weaken and cut the threads.

FIG. 9 is another embodiment of the firing housing 140 according to the present invention. In this embodiment, the firing housing 140 is connected to the output of the inflator and provides an alternate path for the activation of the firing pin 24. The operation of this embodiment is identical to the operation of the preferred embodiment of FIG. 7 except that the firing pin 24, when it crushes the primer 26 then functions as a seal to prevent any inflation gas from escaping. The vent hole 120 is positioned so as to be covered by the firing pin and primer after firing. The shock tube is connected to the output tube of the pyrotechnic passageway by the protective tube 134 and to the air bag in the manner illustrated in FIG. 7.

Figure 10:
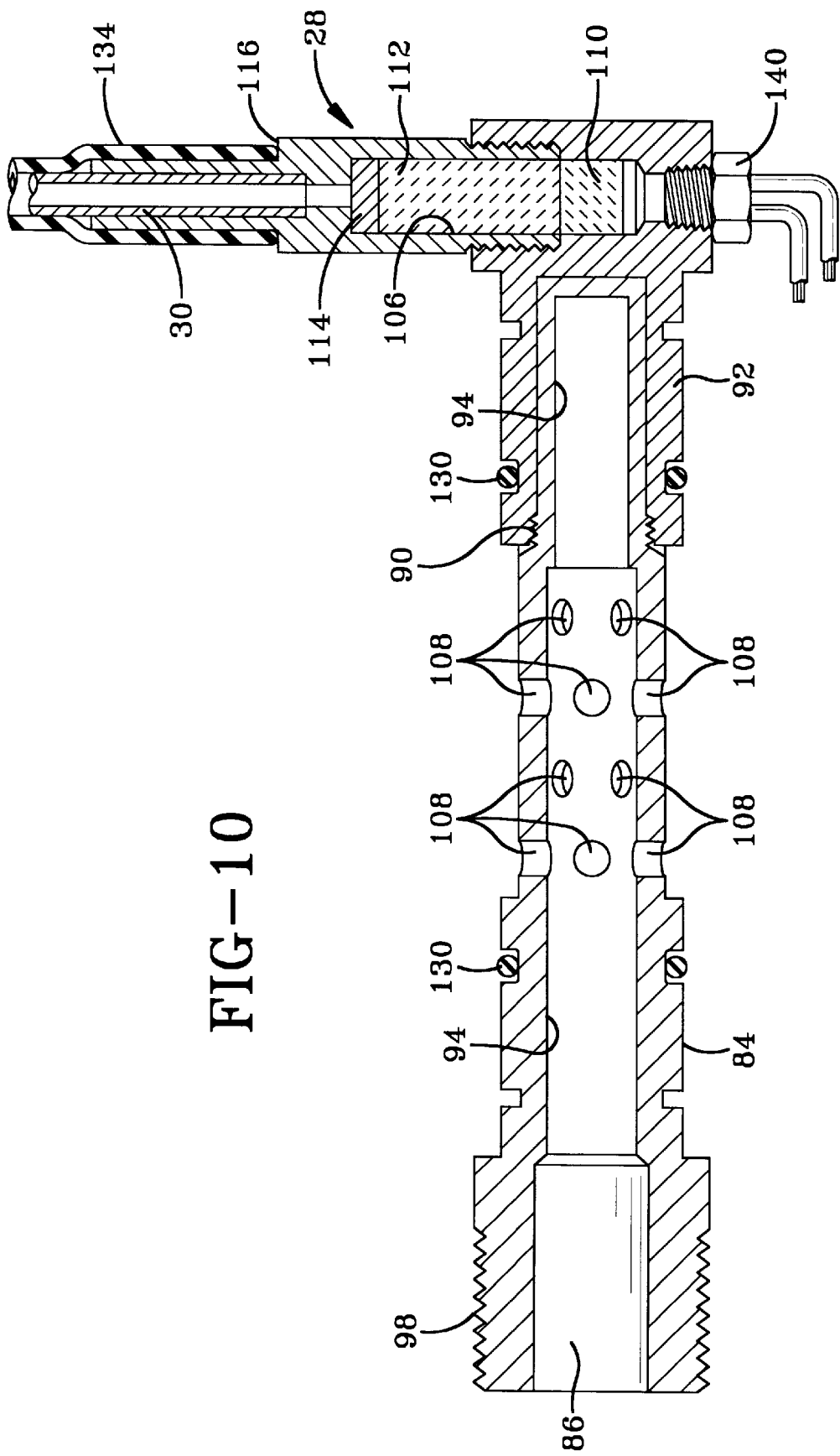
FIG. 10 is an alternate embodiment of the gas distributor and firming mechanism using non-mechanical actuation devices.

FIG. 10 is an alternate embodiment of the gas distributor and firing mechanism using non-mechanical actuation devices. The difference in the construction between FIG. 6 and FIG. 10 is in the firing housing. The firing pin, shear member and primer are not present. The passageway 94 is enclosed at the end. The end of the second or pyrotechnic passageway 28 is open to receive a non-mechanical initiator or pyrotechnic device 140. Typically, the initiator is threaded into the firing housing 94. When the initiator 140 is actuated, it will cause the ignition charge 110 to burn in a manner hereinbefore described. The initiator 140 receives a signal from a crash sensing sensor and in response thereto operates to fire the ignition charge.

The operation of the preferred embodiment of the venting system 10 is as follows. The vehicle starts to crash and as a result, the crash sensor 80 in the inflator 14 receives the crash pulse or sudden deceleration signal. The inflator control circuit 64 functions to heat the squib 82 that in turn ignites the propellant. An inflating gas is formed and as the pressure increases, the gas flows from the inflator 14 to the gas distributor 16.

The gas in the gas inlet housing 84 of the gas distributor 16 actuates the firing pin 24 propelling it to the primer 26. At the same time, the gas leaves the orthogonal orifices 108 and flows along the chamber 18 to the snout 20 and then to the air bag 22. The air bag begins to inflate causing the seat belt 42 to push the occupant 38 back down in the seat 40 and to control the forward inertia of the occupant.

The firing pin 24 strikes the primer 26 causing a flame to ignite the first ignition charge 110 that heats the delay charge 112. The delay charge slowly burns, from T1 to approximately T2. Substantially at T2, the delay charge 112 ignites the second inflation charge 114 that heats up causing the pyrotechnic in the shock tube 30 to burn.

The rate of the burning of the shock tube 30 is approximately 5,000 meters per second, so substantially immediately the end of the shock tube heats the contact charge 32 compound located against the air bag 22. The compound causes the threads 46, 48 in the air bag to weaken and eventually break causing a rip 44 to travel along the surface of the pressurized air bag 22. The rip 44 travels very quickly and the pressurized gas immediately leaves the air bag 22. The rebound of the occupant 38 due to the gas pressure in the inflatable is diminished. The air bag 22 being deflated, the occupant who then can leave the seat 40 can now release the seat belt 42. The pyrotechnic compounds do exhibit non-flaming burning.

The source of inflation gas can be from a gas generator such as a pyrotechnic inflator or a stored gas system. It is important that the inflation fluid is a gas under sufficient pressure to activate the firing pin 24 and to inflate the air bag or inflatable 22.

There has thus been shown and described a venting system for a time-activated vent of an inflatable such as an air bag in a motor vehicle. The actuation of the vent is at a predetermined time after the initiation of a crash pulse as sensed and interpreted by the control circuit of a gas generator or source of inflation gas.

What is claimed is:

1. A venting system for an inflatable air bag connected to a seat belt webbing having one end of the air bag connected to a source of inflation gas, the system comprising:

an elongated passageway connected at one end to the source of inflation gas;

a firing pin located in said passageway and operatively coupled to and responsive to the pressure of the inflation gas for axially moving along said passageway;

a primer located at the other end of said passageway downstream of said firing pin, said primer axially in line with said firing pin and responsive to the movement of said firing pin for igniting an ignition charge; and a pyrotechnic device connected at one end to the air bag and at the other end to said ignition charge, said device responsive to said ignition charge for opening a rip in the air bag for allowing the inflation gas to escape.

2. The system according to claim 1 additionally including a delay generator between said primer and said pyrotechnic device, said delay generator in response to said primer operates causing said ignition charge to activate said pyrotechnic device.

3. The system according to claim 1 additionally including a vent hole adjacent said primer for venting any fluid in said passageway from interfering with the movement of said firing pin.

4. The system according to claim 1 wherein said pyrotechnic device is a transferring linear explosive device.

5. The system according to claim 4 wherein said pyrotechnic device is a shock tube.

6. The system according to claim 4 wherein said pyrotechnic device is a ballistic gas tube.

7. The system according to claim 1 wherein said passageway is in a gas distributor comprising gas inlet housing and a firing housing, wherein said housings are axially secured together forming a rigid member.

8. The system according to claim 7 wherein said inlet housing and said firing housing are threaded together forming said rigid member.

9. The system according to claim 7 wherein said inlet housing and said firing housing are mated together by means of a key in one of said housings and a key-way in the other of said housing forming said rigid member.

10. The system according to claim 7 wherein said inlet housing and said firing housing are mated together by one of said housings having a female receptacle of a given geometric shape and said other housing having a congruent geometric shape which when mated form said rigid member.

11. The system according to claim 7 wherein said firing housing has said firing pin in said passageway and at one end adjacent said inlet housing and axially spaced therefrom in said passageway is said primer interfacing with a pyrotechnic passageway.

12. The system according to claim 11 wherein said firing pin is located in said passageway and has a shearing member for normally locating and securing said firing pin in said passageway.

13. The system according to claim 12 wherein said shearing member shears in response to the pressure of the inflation gas for propelling said firing pin to said primer.

14. The system according to claim 12 wherein said shearing member is a shear pin.

15. The system according to claim 12 wherein said shearing member is shear rim located circumferentially around the back of the firing pin and extending in a radial direction for being held by an internal shoulder in said passageway.

16. The system according to claim 11 wherein said pyrotechnic passageway contains a first ignition charge, a delay column and a second ignition charge.

17. The system according to claim 16 wherein said second ignition charge interfaces with said pyrotechnic device.

18. The system according to claim 7 wherein said gas distributor has a plurality of radially extending orifices extending in a direction orthogonal to the axis of said passageway for thrust-neutralizing said gas distributor.

19. The system according to claim 18 wherein said total cross-section area of said orifices is greater than the cross-section area of said passageway by a factor greater than one and less than two.

20. The system according to claim 1 wherein said passageway is in a gas distributor comprising an inlet housing and a firing housing, wherein said housings are mated in a slip fit manner forming a unitary member.

21. The system according to claim 20 wherein said firing housing has said firing pin in said passageway and at one end adjacent said inlet housing and axially spaced therefrom in said passageway is said primer interfacing with a pyrotechnic passageway.

22. The system according to claim 21 wherein said firing pin is located in said passageway and having a shearing member for normally locating and securing said firing pin is said passageway.

23. The system according to claim 22 wherein said shearing member shears in response to the pressure of the inflation gas for propelling said firing pin to said primer.

24. The system according to claim 22 wherein said shearing member is a shear pin.

25. The system according to claim 22 wherein said shearing member is a shear rim located circumferentially around the back of the firing pin and extending in a radial direction for being held by an internal shoulder in said passageway.

26. The system according to claim 21 wherein said pyrotechnic passageway contains said ignition charge, a delay column and a second ignition charge.

27. The system according to claim 26 wherein said second ignition charge interfaces with said pyrotechnic device.

28. The system according to claim 18 wherein said gas distributor has a plurality of radially extending orifices extending in a direction orthogonal to the axis of said passageway for thrust-neutralizing said gas distributor.

29. The system according to claim 28 wherein the total cross-section area of said orifices is greater than the cross-section area of said passageway by a factor greater than one and less than two.

30. A venting system for an inflatable air bag connected to a seat belt webbing having one end of the air bag connected to a source of inflation gas, the system comprising:

a sensor responding to a crash pulse for generating an actuating signal;

a pyrotechnic device connected at one end to the air bag and at the other end to an ignition charge, said device responsive to said ignition charge for opening a rip in the air bag for allowing the inflation gas to escape; and an initiator responsive to said actuating signal for igniting said ignition charge.

* * * * *